US005572873A

United States Patent [19]
Lavigne et al.

[11] Patent Number: 5,572,873
[45] Date of Patent: Nov. 12, 1996

[54] CARRIER METHOD AND APPARATUS FOR MAINTAINING PHARMACEUTICAL INTEGRITY

[75] Inventors: Robert A. Lavigne, Tucson, Ariz.; Robert C. Kellow, Alvarado, Tex.

[73] Assignee: Emertech Incorporated, Tucson, Ariz.

[21] Appl. No.: 397,572

[22] Filed: Mar. 2, 1995

[51] Int. Cl.[6] ............................. F25B 21/02; F25B 49/00
[52] U.S. Cl. ............................. 62/3.62; 62/126; 62/129
[58] Field of Search .............................. 62/3.2, 3.3, 3.7, 62/3.62, 125, 126–129, 331, 457.1, 457.9; 128/903; 768/278

[56] References Cited

U.S. PATENT DOCUMENTS

| | | | |
|---|---|---|---|
| 2,741,099 | 4/1956 | Beane | 62/126 |
| 4,318,276 | 3/1982 | Sato et al. | 62/126 |
| 4,364,234 | 12/1982 | Reed | 62/3.3 |
| 4,407,133 | 10/1983 | Edmonson | 62/3.62 |
| 4,823,982 | 4/1989 | Aten et al. | 221/3 |
| 4,857,716 | 8/1989 | Gombrich et al. | 235/462 |
| 4,961,320 | 10/1990 | Gutman | 62/3.2 |
| 4,962,491 | 10/1990 | Schaeffer | 368/21 |
| 5,061,630 | 10/1991 | Knopf et al. | 435/290 |
| 5,128,552 | 7/1992 | Fang et al. | 307/66 |
| 5,437,163 | 8/1995 | Jurewicz et al. | 62/126 |

*Primary Examiner*—William Doerrler
*Attorney, Agent, or Firm*—Geoffrey A. Mantooth

[57] ABSTRACT

A carrier apparatus has an insulated structure with a drawer unit located therein. A primary thermal electric cooler (TEC) both heats and cools the pharmaceuticals located in the drawer unit. A controller senses the interior temperature and operates the TEC to maintain the interior temperature at room temperature. One type of temperature sensor is amerced in a liquid to better approximate the temperature of the pharmaceuticals. The drawer unit has an insulated refrigerated drawer, which holds refrigerated drugs. The refrigerated drawer has a TEC that is operated by the controller. The controller monitors a number of parameters, such temperature, time, and battery charge level, as well as a number of events, such as door and drawer openings and closings, operation of any TEC, and pharmaceutical temperatures being out of range. The controller also accepts patient treatment information by way of keypad entries. All of this information is recorded in non-volatile memory on a periodic basis so as to form a state record. The state record can be used to show that the pharmaceuticals in the carrier have been maintained in temperature compliance, as well as for other purposes.

30 Claims, 8 Drawing Sheets

CARRIER METHOD AND APPARATUS FOR MAINTAINING PHARMACEUTICAL INTEGRITY

FIELD OF THE INVENTION

The present invention relates carrier methods and apparatuses for carrying and containing pharmaceuticals to remote locations and also for monitoring the conditions of those pharmaceuticals.

BACKGROUND OF THE INVENTION

Most pharmaceutical substances, such as Epinephrine, Diazepam, and Naloxone, are temperature sensitive. For example, many drugs are required by their manufacturers to be maintained at room temperature (59–86 degrees Fahrenheit). The drugs be maintained within a predetermined temperature range in order to prevent alteration of the drugs.

In buildings such as hospitals or pharmacies, maintaining the temperature of drugs within the required range is relatively simple. Heating, ventilation and air conditioning (HVAC) systems provide a stable room temperature environment inside of the building. Some drugs, known as "refrigerated drugs", are required to be kept at refrigerated (or chilled) temperatures. These drugs can be stocked inside of a suitable refrigerator located inside of the building. However, removing refrigerated drugs from a hospital or pharmacy to an ambulance or other remote location typically exposes the drugs to temperatures outside of the required ranges.

If a drug is maintained outside of its required temperature range for an extended period of time, the drug could be altered in such a way so as to lose its efficacy. Thus, the drug could be administered in a life-threatening situation, only to impede the administration of proper health care due to a misplaced reliance on the effectiveness of the drug. Even worse, temperature effects on the drug could make the drug toxic to a human being.

There exists in the prior art devices for storing drugs within a temperature control environment. Such devices are portable so as to be carded about on ambulances and alike. One such prior art device is described in U.S. Pat. No. 5,217,064. One of the inventors of this application is a co-inventor of U.S. Pat. No. 5,217,064.

It is desired to improve on the prior art devices in general, and specifically on the device described in U.S. Pat. No. 5,217,064. One such improvement is the recording and reporting of instances whenever a drug is exposed to a temperature outside of its required temperature range, when the drug is carried in a portable temperature controlled carrier device. Such a reporting and recording capability is intended to improve the safety and effectiveness of the drugs.

Still another improvement involves maintaining an accountability of the drugs and the administration thereof. Under the prior art, once a drug leaves a pharmacy in a carrier device, circumstances concerning the drug (for example, temperature history, possession and control) are loosely monitored. It is desirable to monitor the administration and disposition of a drug once it leaves the pharmacy in a portable carrier device.

Another consideration in the design of a portable carrier apparatus for pharmaceuticals is the limited energy supply available for maintaining the temperature of the pharmaceuticals. For this reason, it is desirable to temporarily cease efforts in controlling temperature of the pharmaceuticals whenever the carrier is opened to the outside environment. This prevents the unnecessary loss of energy to the outside environment. Many pharmaceuticals are in liquid form. Thus, they have some thermal storage capacity. In other words, when the carrier is open and the pharmaceuticals located inside are exposed to temperatures exceeding their range, the pharmaceuticals will not be instantly compromised, due to the fact that some finite time is required for the liquid pharmaceuticals to exchange energy to the outside environment. It is desirable to measure this thermal storage capacity of pharmaceuticals and utilize such a measurement in regulating the temperature of the pharmaceuticals in order to conserve the energy supply on the carrier.

SUMMARY OF THE INVENTION

It is an object of the present invention to record information regarding instances of a pharmaceutical being exposed to a temperature outside of its temperature range, as well as instances of when a pharmaceutical is not exposed to a temperature outside of its required temperature range.

It is another object of the present invention to provide a carrier apparatus and method for maintaining accountability of pharmaceuticals that are contained in the carrier apparatus.

It is another object of the present invention to record information regarding the dispensation of pharmaceuticals from a portable carrier to a patient.

The present invention provides a carrier apparatus for maintaining proper temperatures of pharmaceuticals. The carrier apparatus includes a substantially enclosed and thermally insulated structure having a port which opens to provide access to a cavity located within the structure. The structure receives the pharmaceuticals. A heat pump is coupled to the structure and pumps heat in to and out of the cavity. There is a temperature sensor located in the cavity. The apparatus has a means for controlling the heat pump so as to maintain a storage temperature of the cavity within a predetermined temperature range. The storage temperature is as sensed by the temperature sensor. The means for controlling the heat pump has an input that is connected to the temperature sensor. There is also a means for recording information regarding fluctuations of the storage temperature with respect to the predetermined temperature range. The means for recording information is connected to the temperature sensor.

In one aspect of the present invention, the means for recording information regarding fluctuations of the storage temperature further includes means for recording occurrences of the storage temperature exceeding the predetermined temperature range. In addition, the predetermined temperature range has an upper temperature limit and a lower temperature limit. The means for recording information regarding fluctuations of the storage temperature also includes means for recording a occurrences of the storage temperature approaching, within a second predetermined temperature range, the upper or lower temperature limits.

With the present invention, not only can pharmaceuticals be transported from location to another in a portable temperature controlled carrier, but the pharmaceuticals are monitored for compliance with temperature requirements. The monitoring occurs in the form of recording information relating to temperature fluctuations of the internal temperature in the carrier. In one aspect of the invention, this information is recorded in non-volatile memory. This information provides accountability of the safety and the effectiveness of the drugs in the carrier. Also, a record is formed of compliance with temperature requirements of the drugs within the carrier.

In another aspect of the present invention, the carrier includes a battery that is connected to the heat pump and to the means for controlling the heat pump. There is a means for recording occurrences of the battery operating below a predetermined charge level. This information is relevant to determining battery life. The battery is rechargeable. There is also provided a means for recording the number of charge and discharge cycles encountered by the battery. This is information is relevant to determining if the battery should be replaced.

In accordance with another aspect of the present invention, the carrier includes a printer. The printer has an input that is connected to the means for recording information. The printer allows a paper copy of the recorded information to be provided. Such information if typically useful in a hospital environment where a patient has been brought in on an ambulance. The attending hospital personnel can obtain an accurate record of the pharmaceuticals dispensed to the patient even though the hospital personnel were not present in the ambulance.

Some drugs are controlled substances, wherein their access is tightly controlled. The carrier apparatus, in another aspect of the present invention, includes a container located inside of the insulated structure. The container has a lock, which can be unlocked by a key. Controlled substances can be stored in this container. The operator who is in charge of the carrier can have the key.

In accordance with another aspect of the present invention, a sharps box is mounted to the structure. The sharps box receives discarded sharp objects, such as hypodermic needles.

In accordance with another aspect of the present invention, the structure has a door which opens to allow access to the cavity. The door has a lock. There is also a means for activating the lock so as to lock the door when the pharmaceuticals have been stored out of the temperature range. This provides a physical barrier to accessing the pharmaceuticals inside of the carrier which pharmaceuticals have been compromised by a temperature violation. The lock is provided with a mechanical override arrangement so that in emergency situations, the pharmaceuticals can be accessed.

In accordance with another aspect of the present invention, a system for monitoring pharmaceuticals is provided. The system includes plural portable and thermally insulated carriers. Each carrier includes a cavity, a temperature regulator inside of the cavity, means for controlling the temperature regulator so as to maintain a storage temperature of the cavity within a predetermined temperature range and means for recording information regarding fluctuations of the storage temperature. There is also a means for processing the information from the plural carriers. There is a means for transferring the information from the respective carriers to the means for processing. The means for processing information from the carriers processes the information in order to monitor the compliance of the carriers in maintaining the pharmaceuticals in accordance with temperature requirements, as well as determining the individuals involved and the reasons for lack of compliance.

DESCRIPTION OF THE PREFERRED EMBODIMENT

Figure 1:
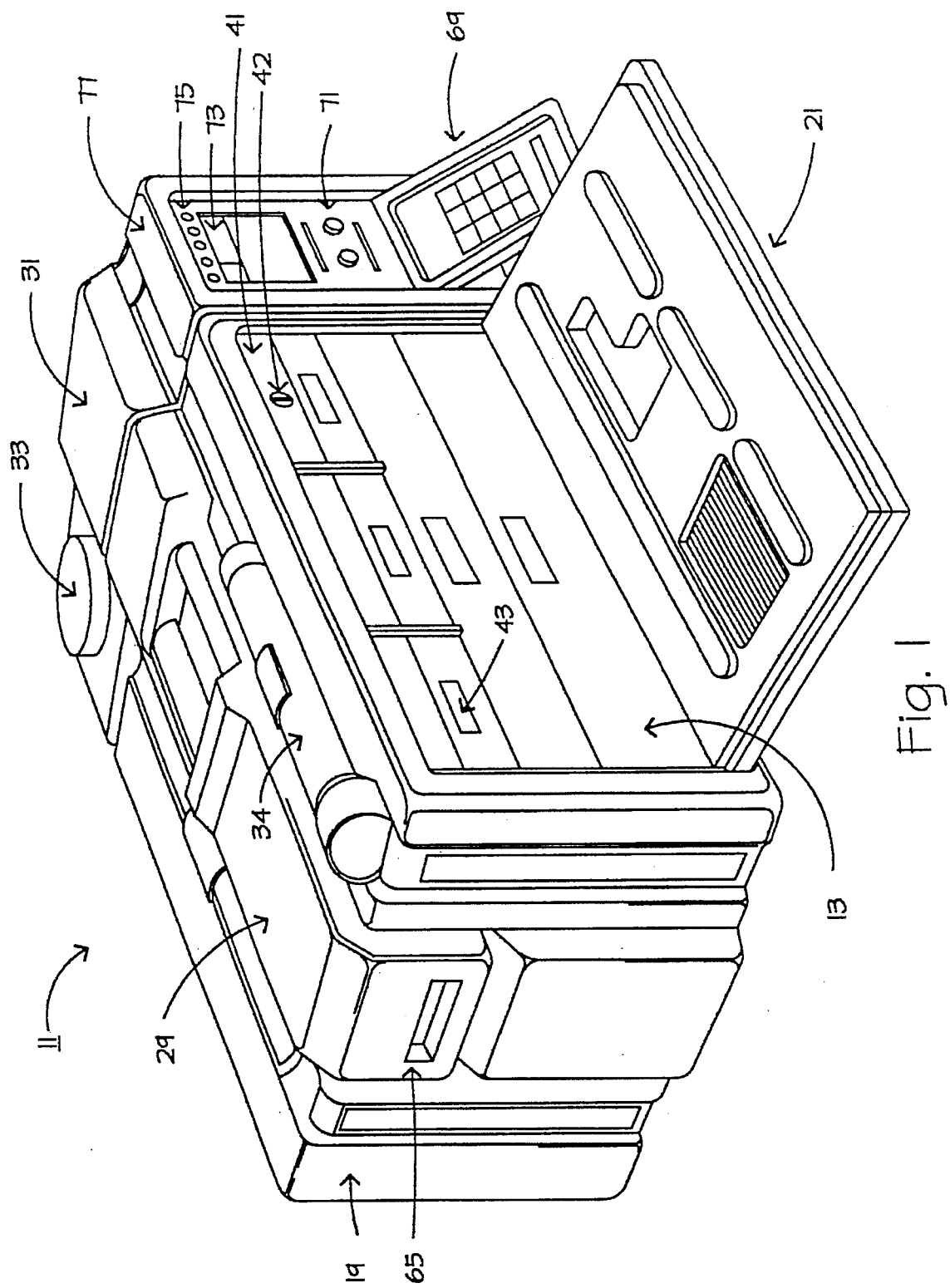
FIG. 1 is an isometric view of the carrier apparatus of the present invention, in accordance with a preferred embodiment.
Figure 2:
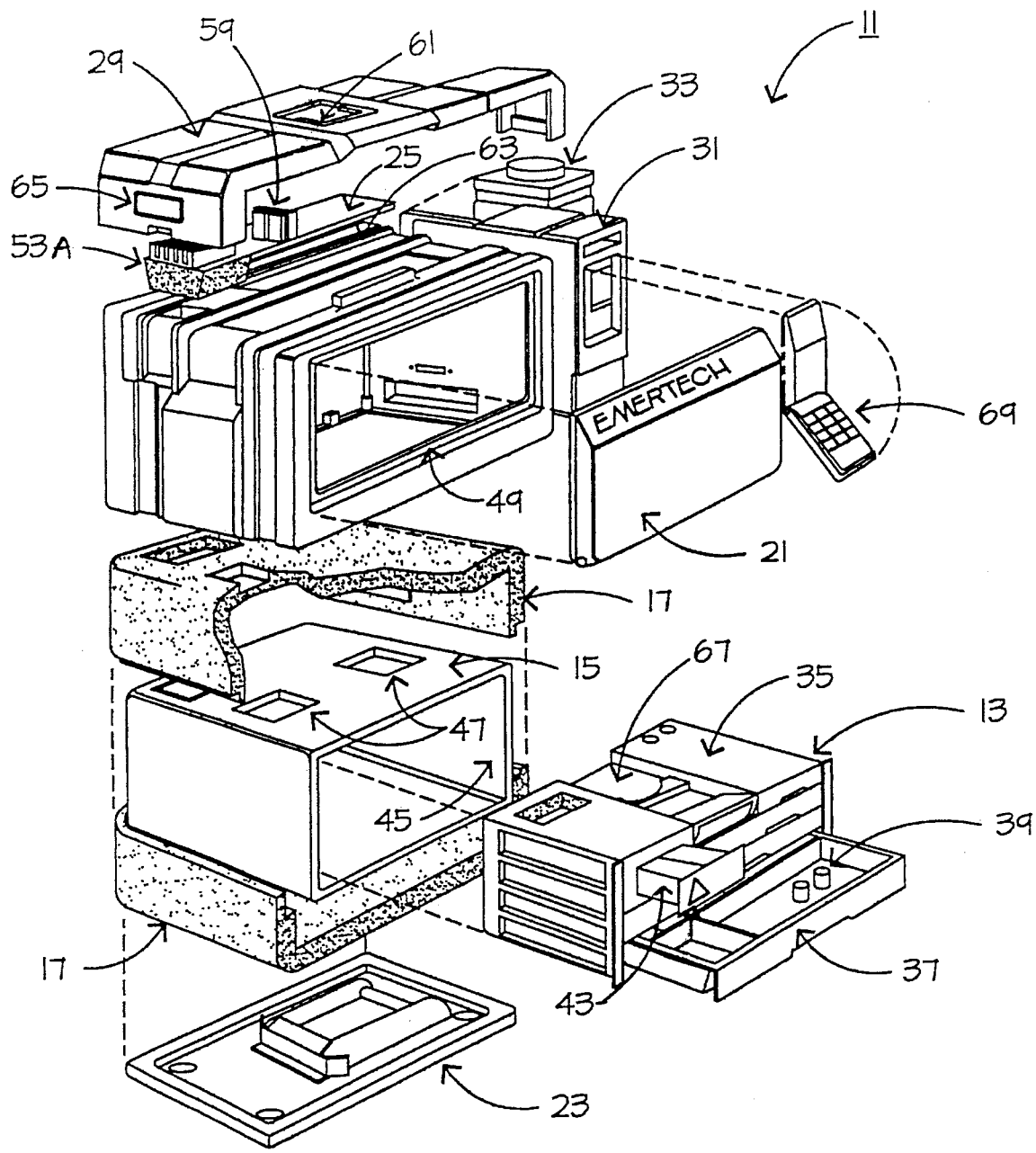
FIG. 2 is an exploded isometric view of the carrier apparatus of FIG. 1, shown with several components cut away.

Referring to FIGS. 1 and 2, there is shown a carrier apparatus 11 of the present invention, in accordance with a preferred embodiment. The carrier apparatus 11 includes a drawer unit 13, and interior case 15, insulation 17, an exterior case 19, a door 21, a bottom panel 23, thermal electric coolers (TECs) 25, 27, a handle unit 29, a control module 31, and a sharps box 33.

The drawer unit 13 has a case or shell 35 and plural drawers 37 or trays therein. The drawers 37 receive containers 39 of pharmaceuticals. The drawers slide in and out of the case 35. The drawers can be provided with subdividers to assist in organizing the pharmaceuticals. One of the drawers 41 has a key lock 42 thereon. This drawer 41 is used to contain controlled substances. In order to open the drawer, an operator must insert a key into the key lock 42 and unlock the drawer. Another drawer 43 is contained in an insulated portion of the case 35, so that the drawer is thermally insulated on all sides. This drawer 43 is used to contain drugs that are maintained at a temperature that is different from the drugs in the other drawers. For example, "refrigerated drugs" can be contained in this insulated drawer 43. Refrigerated drugs typically are required to be stored at colder temperatures (for example 35–50 degrees Fahrenheit) than room temperature.

The drawer unit 13 fits inside of the interior case 15. The interior case 15 is dosed on all sides except for a front opening 45 (referring to the orientation of FIG. 2). The front opening 45 allows the drawers 37 to be pulled out from the drawer unit 13. The interior case 15 also has openings 47 in the top for heat exchangers. The interior case 15 is surrounded on all sides, with the exception of the front opening, by the insulation 17. The insulation 17 is of the thermal type (for example, polystyrene foam).

The exterior case 19 surrounds the top and three sides of the insulation 17. The exterior case is made of a rigid, durable material such as high impact plastic. The front of the exterior case 19 has an opening 49 for allowing the drawers 37 to slide out. The door 21 covers the opening 49 to provide a thermal seal. The door 21 is thermally insulated and is coupled to the exterior case by hinges. The exterior case 19 has a bottom opening that receives the bottom panel 23. The bottom panel 23 is coupled to the exterior case by fasteners.

Figure 2C:
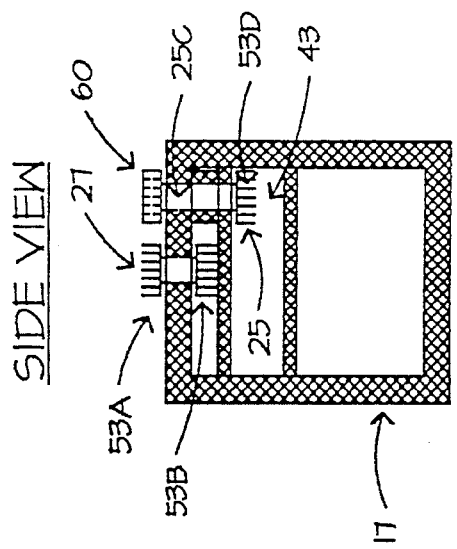
FIG. 2C is a schematic cross-sectional side view of FIG. 2B.
Figure 2A:
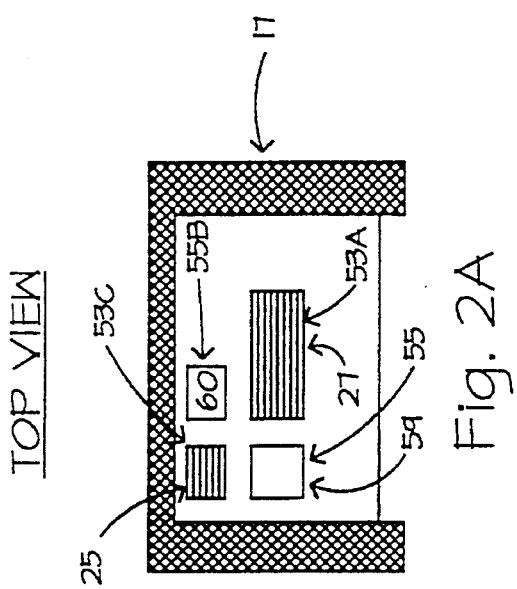
FIG. 2A is a schematic cross-sectional top view of the carrier apparatus showing the arrangement of the TEC's.
Figure 2B:
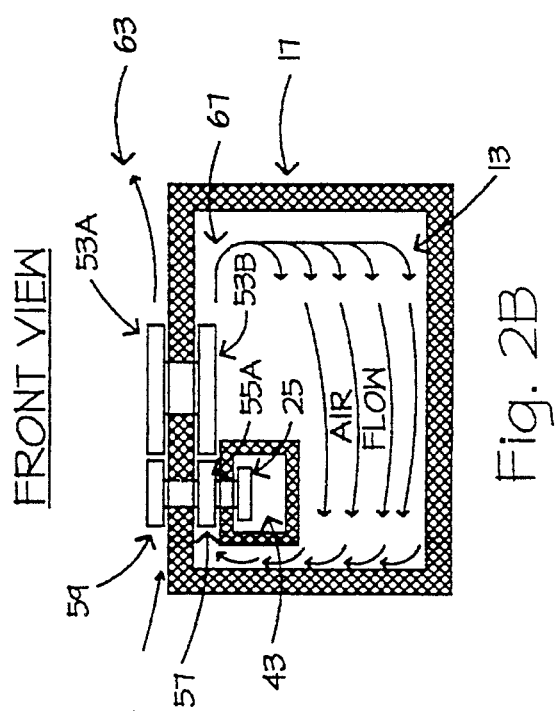
FIG. 2B is a schematic cross-sectional front view of FIG. 2A.

The carrier has a primary TEC 27 (for the drawers 37) and a secondary TEC 25 (for the refrigerated drug drawer 43). (In FIG. 2, only the secondary TEC is shown, for purposes of clarity in the drawing. Both TEC's are shown in FIGS. 2A, 2B and 2C.) Each TEC includes one or more solid state heat pumps (such as thermopiles or thermocouples) that operate by way of the Peltier effect. The primary TEC 27 has fins 53A, 53B (both interior and exterior fins). The primary TEC 27 is provided with two motors 55, 55A (see FIG. 3) that respectively operate an interior fan 57, and an exterior fan 59. Referring to FIGS. 2A, 2B, and 2C, one motor 55 and one fan 59 are external and are located adjacent to the exterior fins 53A. The other motor 55A and fan 57 are internal and are located adjacent to the internal fins 53B. The secondary TEC 25 has external fins 53C that are located outside of the interior case 15. A motor 55B and fan 60 are located adjacent to the fins 53A. The secondary TEC 25 does not have a fan that is internal to the refrigerated drugs drawer 43. This is because the drawer 43 is sufficiently small in volume so as to allow satisfactory heat transfer throughout. However, the secondary TEC 25 is provided with fins 53D that are internal to the drawer 43.

The primary TEC 27 is located on the top side of the exterior case 19. Its exterior fins and exterior fan are covered by the handle unit 29. The handle unit 29, which provides a handle 61, is coupled to the sides of the exterior case 19. The handle unit 29 forms an exterior plenum 63 around the exterior fins 53A, 53C and the fans 59, 60 (see FIGS. 2 and 2B). The exterior plenum 63 is closed off from the exterior air except for a port 65 in each end of the handle unit 29. The exterior fans draw air in through one port 65, through the plenum 63, across the exterior fins and out through the opposite port. The interior fins 53B and the fan 57 of the primary TEC are positioned in an internal plenum 67 inside of the interior case 19, so as to allow air circulation therethrough. The case 35 of the drawer unit 13 is perforated so as to allow air to circulate therethrough.

The secondary TEC 25 is also located on the top side of the exterior case 19. Its exterior fins and fan are located in the exterior plenum 63 underneath the handle unit 29. The secondary TEC 25 uses an elongated transfer block 25C to pass through the interior plenum 67 into the refrigerated drawer 43 (see FIG. 2C). The transfer block is insulated.

The TECs 25, 27 may include plural TECs stacked in a cascaded assembly, with each TEC pumping heat to an adjacent TEC.

The control module 31 is coupled to one side of the exterior case 19. A series of electrical connectors provides electrical communication between the control module and electronic components in the exterior case. The control module 31 has an interface that includes a key pad 69, a printer 71, a data key reader or socket 73, indicator lights 75, and a speaker 77. The keypad can be located on top of the carrier. In addition, the key pad can be fixed to the carrier or detachable therefrom. If the keypad is detachable, then a communications link is provided between the keypad and the carrier. The communications link can be a cable, or it can be wireless, wherein communications is over a radio frequency or infrared channel. The control module 31 also houses batteries 51 that provide electrical power to the electronic components. The batteries are rechargeable.

The sharps box 33 is coupled to the side of the exterior case 19. The box is conventional and provides for safe disposal of hypodermic needles and other contaminated sharp objects.

The exterior case may also be provided with a flashlight 34. The flash light is clamped on top of the exterior case 19. An internal light is also provided.

The carrier has electronics for monitoring various parameters of the carrier and its drugs. The carrier electronics are mostly contained in the control module 31.

The carrier electronics will now be described with reference to FIG. 3. There is provided a controller 79 and a power switching circuit 81. In general, the controller 79 communicates with an operator through the operator interface, monitors and records the state of various parameters of the carrier, and controls the operation of the TECs and fan motors in order to regulate the interior temperature of the carrier. The power switching circuit 81 provides electrical power to the TECs and the fan motors from either the batteries or external power input.

Figure 3:
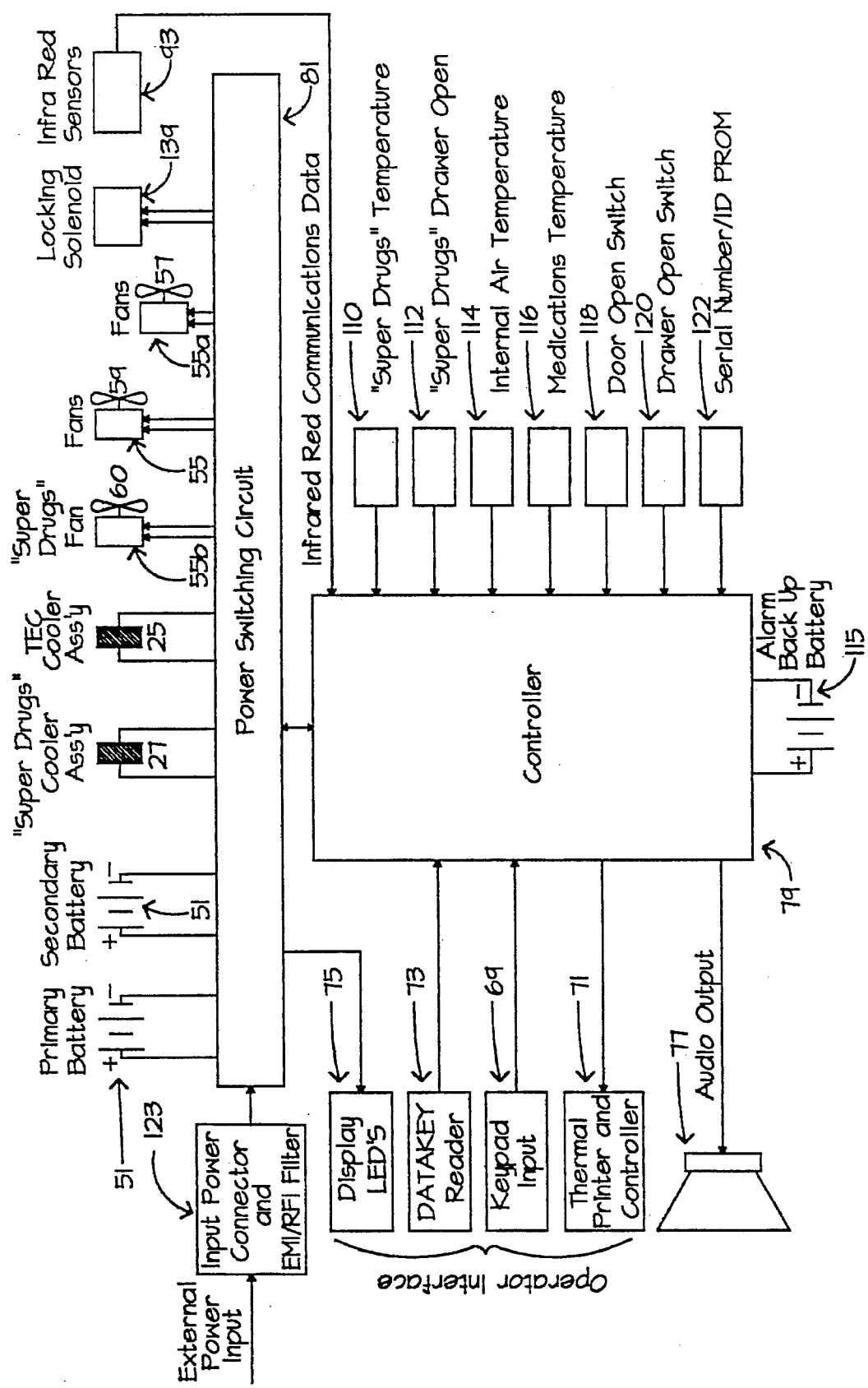
FIG. 3 is a block diagram of the electronics of the carrier apparatus.
Figure 4:
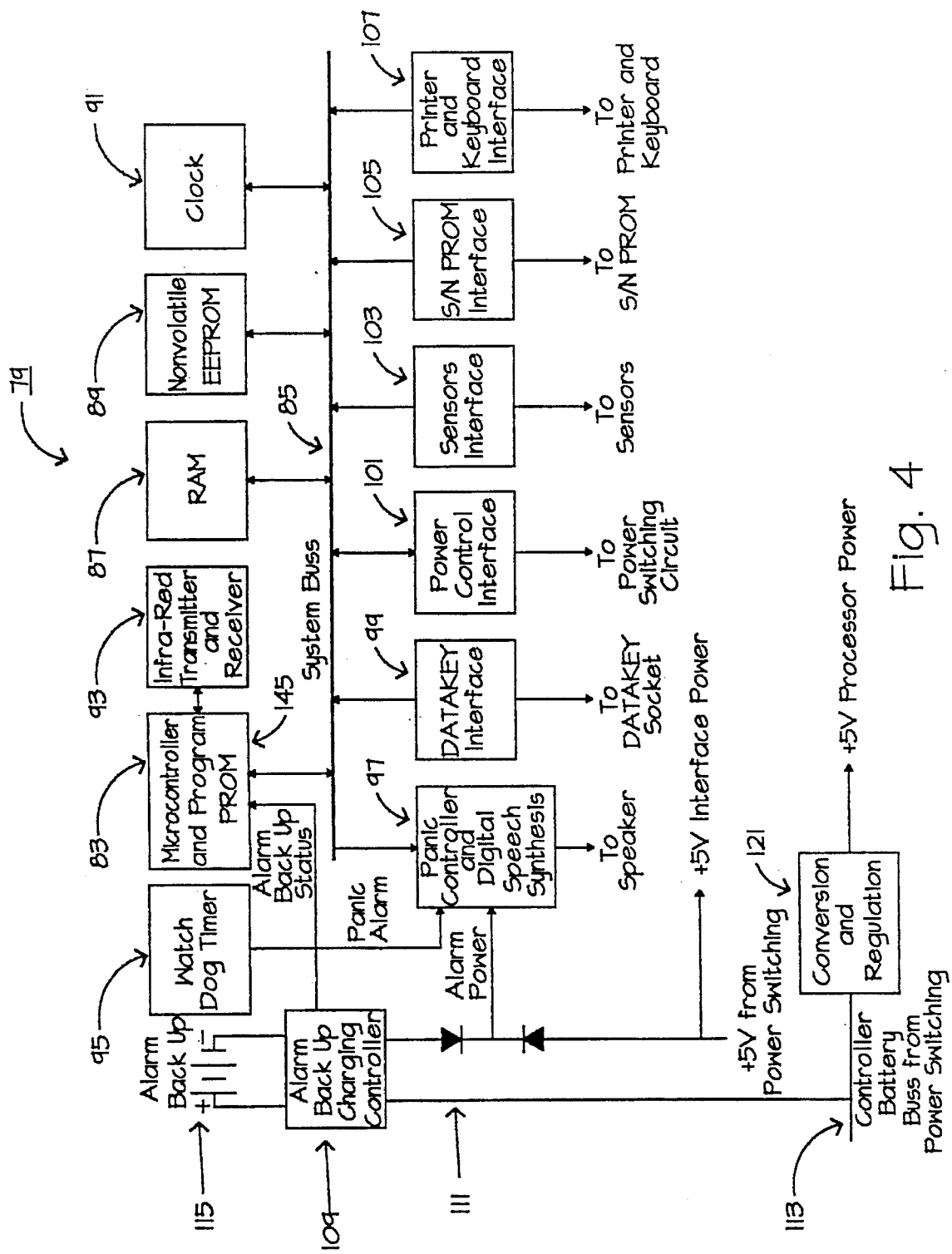
FIG. 4 is a block diagram of the controller.
Figure 7:
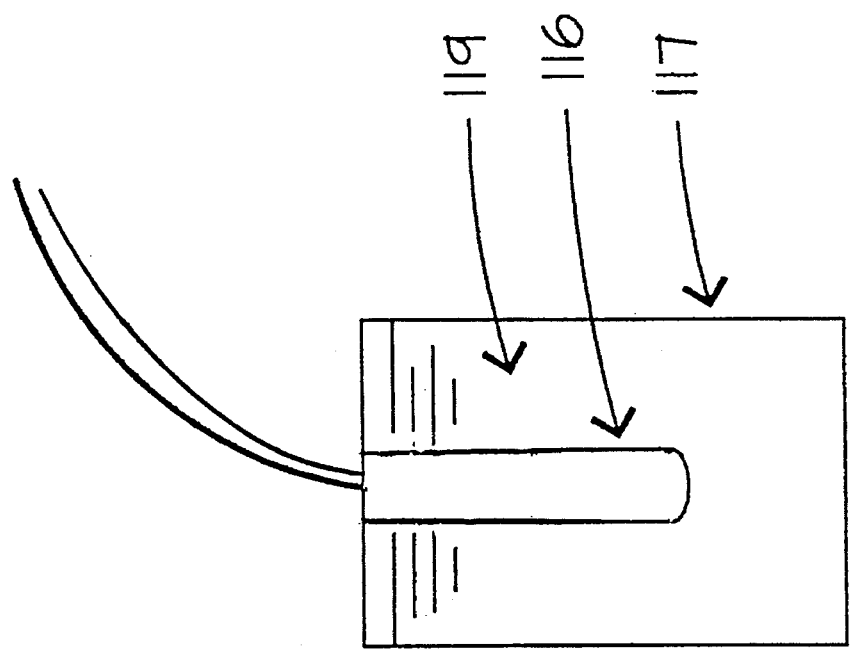
FIG. 7 is a schematic cross-sectional view of a medication temperature sensor.

The controller 79 is shown in more detail in FIG. 4. The controller includes a microcontroller (CPU) and Programmable Read Only Memory (PROM) 83. The microcontroller 83 is a conventional and commercially available device. The microcontroller 83 is connected to other components by way of a system bus 85. There is additional memory in the form of RAM 87 and non-volatile EEPROM 89. The PROM and the RAM contains a program that is executed by the microcontroller. The program will be described below with reference to the operation of the carrier. The EEPROM stores a state record that is created during the operation of the carrier. There is also a clock 91. The microcontroller 83 is directly connected to the infrared transmitter and receiver 93 and to a watch dog timer 95. The system bus 85 is connected to a number of interfaces. Referring to FIGS. 3 and 4, a panic controller and digital speech synthesis circuit 97 is provided and is connected to the speaker 77. The synthesis circuit 97 provides audio prompts or announcements to an operator by way of the speaker 77. A data key interface 99 is connected to the data key reader 73. A power control interface 101 is connected to the power switching circuit 81. A sensor interface 103 is connected to a plurality of sensors. Regarding the sensors (see FIGS. 2 and 3), there is a refrigerated drugs temperature sensor 110 that is located inside of the refrigerated drugs drawer 43, a refrigerated drugs drawer open sensor 112 that is a proximity switch located adjacent to the drawer 43, an internal air temperature sensor 114 located inside of the drawer unit 13, a medication temperature sensor 116 also located inside of the drawer unit 13, a door open switch 118 located adjacent to the closed door 21, and a drawer open switch 120 located adjacent to the controlled substance drawer 41. Referring to FIG. 7, the medication temperature sensor 116 is in a container 117 with a liquid 119 having a specific gravity that is similar to the specific gravity of the drugs. Thus, the temperature of a liquid that approximates the drugs is sensed by the medication temperature sensor 116. In the preferred embodiment, the liquid has a specific gravity of 1.005. The liquid could be an aqueous solution, such as a saline solution. The liquid could also be fresh water.

Another interface is a serial number/PROM interface 105 that is connected to a serial number/identification PROM 122. The PROM 122 is located inside of the exterior case 19. This allows the drawer portion of the carrier apparatus (which contains the drugs) to be serialized while allowing the control module 31 to be interchanged. The controller 79 also has a printer and a key board interface 107 that is connected to the keypad 69 and the printer 71.

The controller 79 has an alarm backup charging controller 109, which has an input 111 connected to a controller battery bus 113. The bus 113 provides electrical power to the charging controller 109, which charges an alarm backup battery 115. The charging controller 109 provides an alarm backup status input 117 to the microcontroller 83 and an alarm power input 117 to the speaker interface 97. The controller battery bus 113 is connected to a conversion and regulation unit 121, which provides electrical power to the interfaces, memory and clock.

Figure 5:
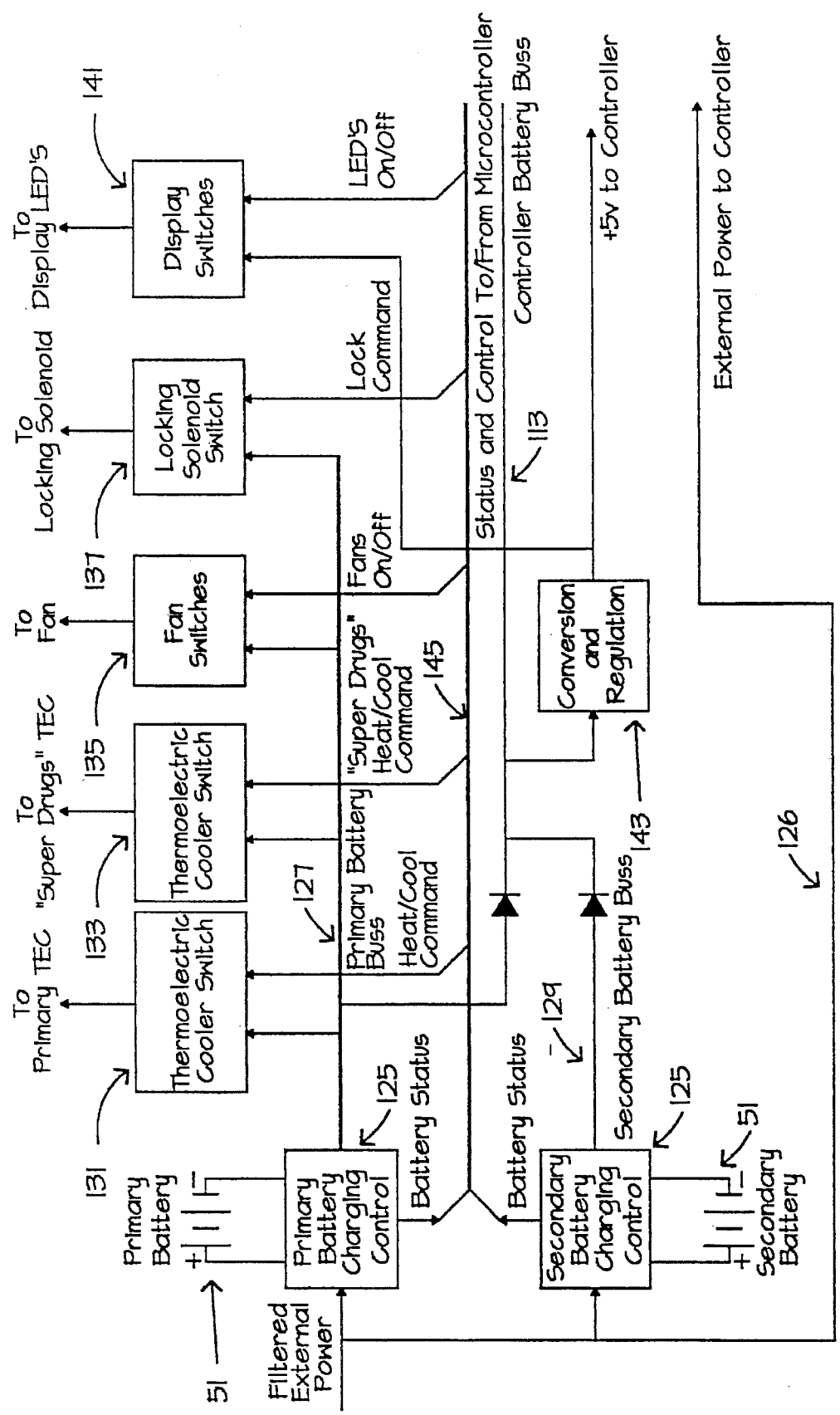
FIG. 5 is a block diagram of the power switching circuit.

Referring to FIGS. 3 and 5, the power switching circuit 81 will now be described. The circuit 81 is connected to external power by a filter 123 (FIG. 3). The filtered external power is provided to charging controls 125 for the primary and secondary batteries 51. The batteries 51 are connected to respective primary and secondary buses 127, 129, which are in turn connected to the controller battery bus 113. The primary battery bus 127 is connected to a primary TEC switch 131 (which is connected to the primary TEC 27), a refrigerated drugs TEC switch 133 (which is connected to the refrigerated drugs TEC 25), fans switches 135 (which are connected to the fan motors 55, 55A), and locking solenoid switch 137 (which is connected to a locking solenoid 139). The locking solenoid 139 is located in the control module 31 and serves to fire into the exterior case 19 and the door 21 to lock the door 21 when the solenoid is energized. Connected to the controller battery bus 113 is a conversion and regulation unit 143, which provides a voltage to the charging controller 109 in FIG. 4 in which also is connected to display switches 141. The display switches 141 are connected to the display LED's (or lights) 75 of FIG. 3. Status and control lines 145 extend to the microcontroller 83 of FIG. 4. The lines 145 provide battery status, heat/cool commands for both TEC's, a fan on/off command, a lock command and LED's on/off.

The carrier 11 stores and maintains drugs at the required temperatures. The drawer unit 13 is maintained within room temperature (59–86 degrees F.). The refrigerated drawer 43 is maintained within 35–50 degrees F. More specifically, the microcontroller 83 determines the temperatures from the sensors 110, 114 & 116. Temperatures are measured at ten second intervals. These temperatures are compared to minimum and maximum temperatures of the appropriate range (room temperature for non-refrigerated drugs and refrigerated temperatures for refrigerated drugs). If the sensed temperature is within a predetermined range of a minimum or a maximum temperature then the microcontroller 82 causes the appropriate TEC to transfer heat into or out of the carrier, thereby bringing the temperature away from an out-of-bounds condition. The disclosure of U.S. Pat. No. 5,217,064 teaches about temperature control of drugs and is herein incorporated by reference.

The controller 79 provides warnings of a temperature violation. When the microcontroller 83 determines that one of the sensed temperatures is within two degrees of the respective minimum or maximum temperatures, then an alarm condition is created.

In addition, the controller 79 monitors various parameters of the carrier to provide a state record. This state record includes a history drug temperatures, carrier operations, abnormal conditions and personnel having physical control of the carrier. The state history is created along with the date and time and is stored in the nonvolatile EEPKOM 89 (so as to be independent of the batteries 51).

The microcontroller 83 obtains parameters and status conditions from the various sensors and status lines and cause the parameters and status conditions to be written to the EEPROM 89. This forms the state history. The following parameters are monitored and stored in the state history:

1) Air temperature inside of the drawer unit 13 (FIG. 2), obtained by way of the internal air temperature sensor 114 (FIG. 3).
2) Internal medication temperature, obtained by the medication temperature sensor 116.
3) Internal refrigerated drugs temperature, obtained by the refrigerated drugs temperature sensor 110.
4) The time of day, measured in a 24 hour format and the calendar date, obtained from the clock 91 (FIG. 4).
5) The charge level of the primary (main heating/cooling), secondary (control electronics) and emergency (alarm backup) batteries, obtained from the status lines 117, 145 (FIGS. 4 and 5).
6) The number of battery discharge cycles, obtained from the status lines 145 (FIGS. 4 and 5).
7) The drug or treatment identification number, obtained from the operator's data entry via the keypad 69 (FIG. 3).
8) The drug quantity administered, obtained from the operator's keypad entry.
9) A patient identification number, obtained from the operator's keypad entry.
10) The identification of the supervisor, the pharmacist or the operator in physical control of the carrier, through their respective data keys and obtained from the data key reader 73 (FIG. 3).
11) The serial number of the carrier, obtained from the PROM 122 (FIG. 3).

The following status conditions are monitored and stored in the state history:

12) The open/closed status of the door 21, obtained by the switch 118 (FIG. 3).
13) The open/closed status of the controlled substance drawer 41, obtained by the switch 120.
14) The open/closed status of the refrigerated drug drawer 43, obtained by the switch 112.
15) The availability of external electrical power, obtained from an external power conductor 126 (FIG. 5) connected to the controller 79.
16) Heating/cooling activated for any TEC, and the particular TEC that is activated, as determined by the microcontroller 83.
17) Whether the fans 57, 59, 60 are on/off, as determined by the microcontroller 83.
18) Drug temperature (both normal and refrigerated drug) being out of bounds, as determined by the microcontroller 83 which receives inputs of the medication temperature and the internal air temperature and compares these temperatures to minimum and maximum temperatures. If the minimum and maximum temperature are exceeded by the sensed temperatures, then a drug temperature out-of-bounds condition is written to the state record.
19) Recording (for a print out of a patient record) running.
20) The door locking mechanism 139 is engaged, as determined by the microcontroller 83 which provides the lock command over lines 145.
21) Storage memory fault, obtained from the memory 87, 89 over the system bus 85.
22) Alarm conditions detected due to a temperature violation, a low charge level on the batteries or the electronics not working.

23) The carrier is in or out of service, obtained from a command or action received by a supervisor, as enabled by a supervisor data key.

24) An unexplained power failure, obtained from the battery status lines 145.

All of the above items are written, as the state record, to the EEPROM 89 every 15 minutes. In addition, every time a monitored event is detected (for example, the door 21 being opened), all of the items are written to the EEPROM 89. The microcontroller 83 monitors the system status at 1/10 second intervals to detect events. The state record data in the EEPROM 89 is not erased. Instead, the oldest data is overwritten. The EEPROM 89 is sized so as to contain several weeks worth of data. When an event is detected, other actions may be taken, such as providing audible or visible alarms and turning the TEC's on or off.

From the information provided and written to the state record, two types of records are created. One type is referred to as an automatic state record, which contains information detected by the microcontroller 83 (for example, temperatures, door and drawer openings and closing, etc.). Another type of state record is a patient state record. A patient state record contains information on individual patients. When an operator administers drugs to a patient, this information is entered by way of the keypad 69. The operator typically enters the type and quantity of drugs administered, and the patient identification. In addition, a code of other services rendered is entered. The patient state record contains all of the information contained in the automatic state record.

A print out of the patient state record is provided by the printer 71 upon the appropriate keypad entries. This allows a paper copy of all drugs, treatments and times administered to the patient to be provided to hospital emergency room staff when the patient arrives on an ambulance.

Figure 6:
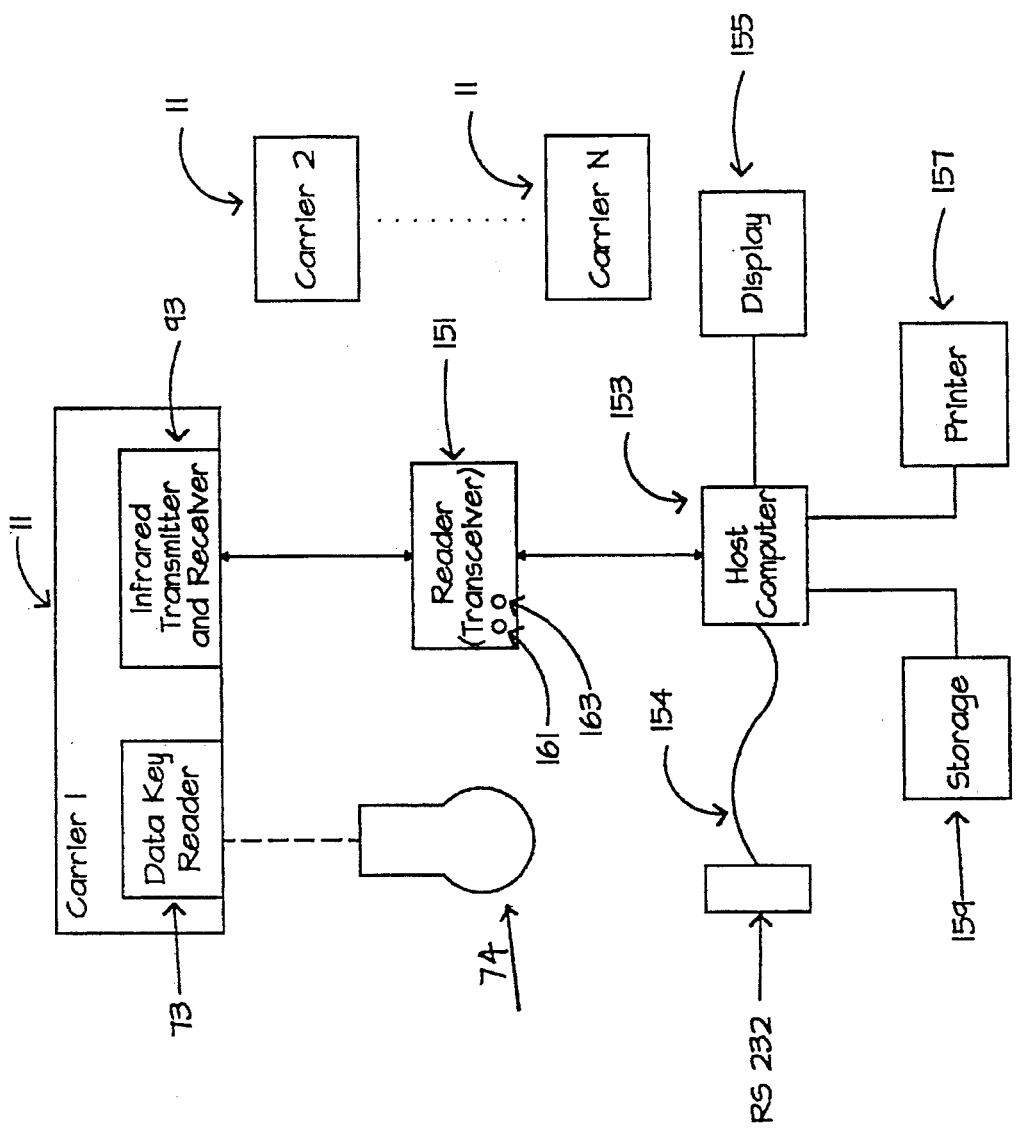
FIG. 6 is a block diagram showing a data transfer between a carrier and a host computer using a reader.

The state history can be retrieved from EEPROM 89 and transferred to another computer. Retrieval of the state history involves using a reader 151 (see FIG. 6). The reader 151 has infrared sensors that cooperate with the infrared sensors 93 on the carrier 11. The reader also has a memory, a power supply and a clock. The reader 151 is portable, typically being of palm size. An operator places the reader 151 next to the infrared sensors 93 of the carrier 11. The reader 151 sends a request to upload data, which request is processed by the microcontroller 83. Once the request is successfully processed, then the microcontroller causes all of the data in the EEPROM 89 to be transferred to the memory of the reader 151 over the infrared data link. This data transfer does not change the contents of the EEPROM 89. The time contained in the clock of the reader 151 can be transferred to the clock 91 of the carrier in order to synchronize the carrier clock 91. After information has been exchanged between the controller 79 and the reader 151, the reader is then disengaged from the carrier 11. The reader 151 is then carried to a host computer 153 and a data link between the two is established. The reader 151 has an RS232 cable and connector 154 connected thereto. This is used to establish a data link with the host computer 153. The state history is then transferred to the host computer 153. The host computer 153 is conventional and has a CPU and memory. In the preferred embodiment, the host computer is a personal computer. The host computer is also connected to a display 155, a printer 157, and a storage device 159, such as a hard disk drive. The host computer also has a clock which updates the clock in the reader.

The host computer collects the state records from plural carriers 11 (FIG. 6), wherein the status of the drugs in the carriers is monitored.

As an alternative to the infrared link between the reader and the carrier, the reader 151A (See FIG. 6A) could be a transceiver. Such a reader 151A would communicate with the carrier using radio frequency communications. Such a reader 151A could in effect be a wireless keypad, having data entry keys 151B and a visual display 151C. Thus, an operator could enter data using the keypad 151B, which data is transmitted to the carrier. The data entries would be displayed on the display 151C. Any response from the carrier would likewise be displayed. The transceiver 151A could also be used to communicate with the host computer in a wireless manner, using the radio frequency communication link. In addition, the transceiver 151A can be used to communicate with a printer located off of the carrier. The printer has a receiver for communicating transceiver 151A. Such a printer can be located in a central location, for example in a hospital emergency room, where it can be accessed by a number of carriers. The use of a remote printer allows the carrier to operate without an on-board printer, thereby conserving space, weight and electrical power.

Figure 6A:
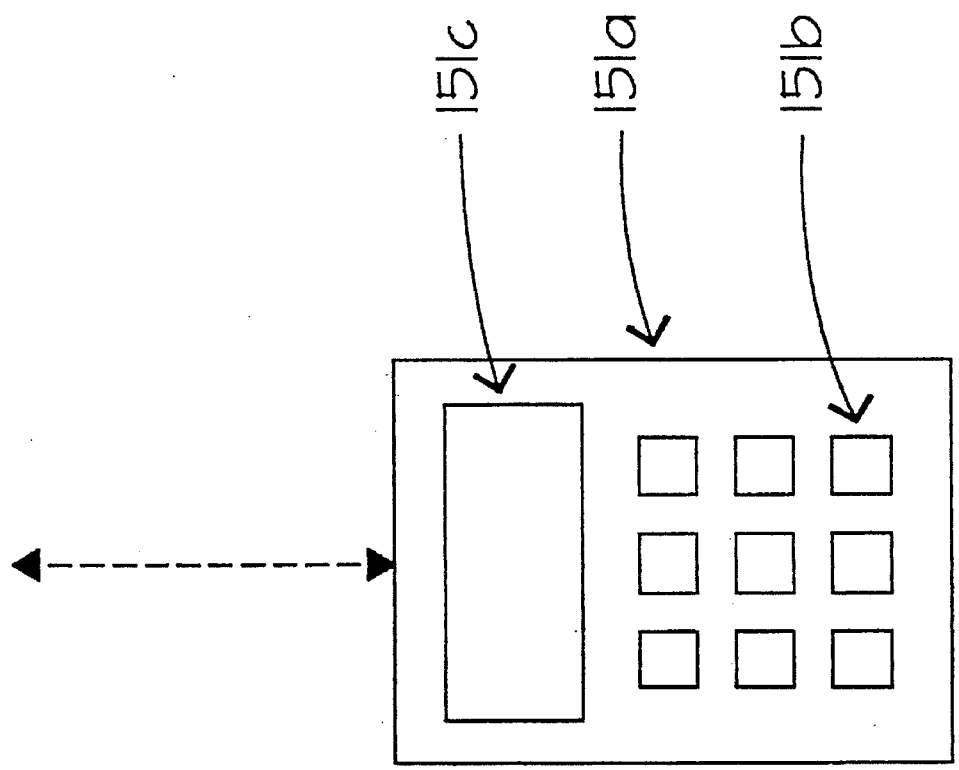
FIG. 6A is a view of a wireless reader or transceiver.

Although FIG. 6A shows a 16 key keypad, more keys can be provided to allow greater simplicity in data entry. For example, an alphanumeric keypad can be provided.

The host computer collects the state records from plural carriers 11 (FIG. 6), wherein the status of the drugs in the carriers is monitored.

In order to provide an accountability of the drugs inside of the carrier, data keys are used to identify those persons who have access to those drugs. There are individual types of data keys, which are namely for a supervisor, a pharmacist, and an operator. All of the data keys contain a magnetic strip with coding thereon. The coding identifies the type of data key and the individual person that has control of the data key. The data keys are inserted into the data key reader 73 (FIG. 3).

A supervisor data key is required to replace the batteries 51. A pharmacist data key is required to reset any alarms and restock the drugs. An operator data key is required to establish ownership of the carrier.

When a supervisor data key is inserted into the carrier 11, an audio response of "supervisor recognized" is produced by the speaker 77. This is followed by an announcement of "enter command". The supervisor can perform four actions, by providing the appropriate keypad sequences. One action is to place the carrier 11 in service, wherein an announcement of "download required" is provided. This indicates that a reader 151 data link is required to obtain clock information. The reader 151 obtains clock information from the host computer 153. The reader is then linked to the carrier, wherein the clock information is loaded into the clock 91. The clock information includes date and time information. An unexplained power loss will produce the announcement "power loss detected" before any other announcement is produced. This advises the supervisor that the battery supply is not functioning properly. Another action that the supervisor can take, is to remove the carrier from service for battery replacement or for long term storage. Once this action is entered by way of the keypad, no further communication with the carrier is permitted until the batteries have been removed and then reinstalled. Still another action available to the supervisor is a data dump. All data (including the state history) is in the EEPROM 89 is transferred to the infrared transmitter and receiver 93 and then on to the reader 151. The data in the carrier is not altered. Instead, the data is written in the EEPROM in a sequential manner. When the EEPROM is full, then the oldest data is overwritten. Still another action is a self test. After performing the desired action, the supervisor data key is removed from the carrier.

The pharmacist data key is used to restock the carrier with drugs and then to clear any out-of-temperature conditions. Thus, the pharmacist can remove any drugs that have been subjected to temperature extremes. When the pharmacist data key is inserted, the announcement "pharmacist recognized" is made. Any audio and visual indications of an out-of-temperature condition are cleared and "controls are reset" is announced. After the carrier has been restocked, the door 21 is closed. This is sensed by the door open switch 117 and "carrier is restocked" is announced. The pharmacist data key is removed from the carrier.

The operator data key is inserted when the operator takes possession of the carrier. The identity of the operator is recorded in the state history. The operator carries the carrier from the pharmacy to an ambulance or other location. When administering drugs to a patent, the operator uses the keypad 69 to enter a patent number, a code for the specific drug used, and codes for other services rendered to the patent. This information is recorded in the state history. The operator is assisted by a menu of codes that is located on the inside of the door 21. When the door 21 is opened, the temperature stabilization system (TEC's and fan motors) is turned off to preserve the batteries.

The indicator LED's 75 provide a quick visual indication to an operator on the status of the carrier its drugs. There is a green LED and a red LED for each storage compartment (the room temperature drawers 37 and the refrigerated drug drawer 43). If the green LED is on continuously, then the temperature drawer of the respective compartment is satisfactory (being within the required temperature range) and the respective TEC is operating. If the green LED is blinking slowly, then the temperature is satisfactory and the respective TEC is off. If the green LED is blinking rapidly, then the temperature of the respective compartment is only 2 degrees from the maximum or minimum temperature. This indicates a violation is close at hand. If the red LED is on, then a temperature violation has occurred in the respective compartment. If the temperature violation has occurred in the drawers 37, then the door 21 will lock, because the microcontroller 83 causes the locking solenoid 139 to lock. If a temperature violation occurs in the refrigerated drug drawer 47, then the door 21 can still be opened.

There is a green LED and a red LED for each of the primary and secondary batteries. If the green LED is on without interruption, then the carrier is on external power. If the green LED is slowly blinking, then the carrier is on battery power and the charge level of the battery is 100%. If the green LED is rapidly blinking, then the respective battery charge level is less than 50%. If the red LED is on, then the respective battery charge level is below 25% and a power supply violation is recorded in the state history. The LED's are off if the batteries have been disconnected.

There is also a microcontroller status LED that is red. If the LED is off, then either the microcontroller is operating normally or the batteries have been disconnected. If the LED is on without interruption, then the electronics are malfunctioning and servicing is required. If the LED is blinking, then an unexplained power loss has occurred.

The reader 151 also has status LED's. There is a green LED 161 and a red LED 163 (see FIG. 6). If the green LED is on, then a data transfer with the carrier is in progress. If the red LED is on without interruption, then all of the electronics logic is lost. If the red LED is blinking, then battery power is low in the reader.

When a carrier is not being used, it is connected to an exterior power supply so as to maintain the batteries 51 in a fully charged condition. In addition, when the carrier is in use, it is connected to exterior power for as long as possible so as to minimize the power drain on the batteries. For example, if the carrier is in an ambulance, it is connected to the ambulance power supply. If the carrier is on a hospital cart, then the carrier is plugged into an electrical wall outlet.

When the carrier is removed from external power, the carrier will begin to draw from its internal batteries 51. The current state record of the carrier will be written to the EEPROM. When the carrier is returned to an external power supply, the carrier will resume operation from that external power supply and begin recharging its internal batteries 51. At this time, another current state record will be written to the EEPROM.

When the door 21 is opened to provided access to the drugs, the current state record will be written to the EEPROM and the primary TEC 25 and primary motor 55 will be turned off in order to conserve battery power. However, due to the extremely temperature sensitive nature of refrigerated drugs, the refrigerated drugs TEC 27 and fan motor 55A will continue to operate normally.

During the time that the door is opened, if the internal temperature of the medications, as measured by the medications temperature sensor 116, exceeds the range 61–84 degrees Fahrenheit, then both audible and visible indications will be provided to caution the operator that the carrier should be closed if possible. The current state record will then be written to the EEPROM. When the door 21 is closed, the heating/cooling functions are reenabled until the temperature of the drugs has returned to a nominal 78 degrees Fahrenheit (25 degrees Celsius). As soon as the drug temperature has returned to normal, the current record is written to EEPROM.

If the door 21 cannot be closed (due to, for example, the nature of the emergency being serviced), and the temperature of the drugs exceeds the range of 59–86 degrees Fahrenheit, both audible and visible indications will be provided to caution the operator that the door will be automatically locked when it is closed. The current state record will be written to the EEPROM at the time that the out of temperature condition is first detected. When the door is closed, it will be locked by the locking solenoid 139 and the current state record will be written to the EEPROM. The heating and cooling functions will be reenabled until the temperature of the drugs has returned to a nominal 78 degrees Fahrenheit. As soon as the temperature the drugs has returned to normal, the current state record state will be written to the EEPROM.

When the refrigerated drugs drawer 43 is opened, the current state record is written to the EEPROM and the heating/cooling functions for the refrigerated drugs drawer is suspended in order to conserve battery power. If the temperature of the drawer 43 exceeds 50 degrees or drops below 35 degrees, both audible and visible indications are provided to caution the operator that these drugs are no longer usable. At this time, the heating and cooling functions for the refrigerated drugs drawer may be disabled in order to conserve battery power and the current state record is written to the EEPROM.

An out-of-temperature condition (for either normal drugs or refrigerated drugs) can be cleared only by the use of a pharmacist data key. Use of a pharmacist data key also reenables the refrigerated drugs heating/cooling functions.

If the door 21 has been locked due to an out-of-temperature condition, then a manual entry is available. This is provided by a mechanical assembly. Should an extreme emergency situation require a manual override of the door lock 139, a current state record will be written to the EEPROM when the door is open. During the time that the door is open, the heating/cooling functions will be suspended to conserve battery power. When the door is closed, the current state record is written to the EEPROM and the door is relocked. The heating/cooling functions are then reenabled until the temperature of the medications has returned to an nominal 72 degrees Fahrenheit. Both the audible and visual indications will continue at all times to remind the operator that the carrier has been locked due to a prior out-of-temperature condition.

Whenever the controlled substance drawer 42 is opened or closed, this is detected by the sensor 120 and the current record is written to the EEPROM.

During normal operation of the carrier, the state of the battery 51 is continuously monitored. If impending discharge conditions of any battery are detected, both audible and visible indications will be provided to caution the operator that the carrier should be returned to external power as soon as possible and the current state record of the carrier state is written to the EEPROM. In addition, heating/cooling functions for the normal drugs are suspended to prevent battery damage from excessively deep discharge. Heating/cooling for the refrigerated drugs continue until the batteries have discharged to the point where any further use would cause permanent damage to the batteries. Normal heating/cooling functions are reenabled when the carrier is connected to external power.

Discharge of either battery will no cause a loss of power to the control electronics. Selection logic is provided so as to select either the primary or the secondary batteries. If either battery becomes discharged, then both audible and visible indications are provided, and the current state record of the carrier state is written to the EEPROM. If the drugs exceed any temperature limitations described above due to discharge of the batteries, then audible and visual indications and the current state record is written to the EEPROM. The number of discharge cycles experienced by the primary and secondary batteries is monitored by the microcontroller 83 and maintained within the state record. This provides an indication of optimum scheduled maintenance and provides information on when the batteries should be replaced.

The number of discharge cycles experienced by the primary and secondary batteries is monitored by the microcontroller and maintained within the state record. This information is utilized to determine when the batteries should be replaced.

During normal operations, internal data cross-checking is performed. If the microcontroller detects an error in the internal data stored in the EEPROM, RAM or during data transfer to and from the reader 151, then both audible and visible indications are provided to caution the operator that the carrier is no longer reliable and should be serviced.

In the case of catastrophic failure of the carrier (due to power loss or component failure), then the data in the EEPROM can be recovered, to provide a record of parameters and status conditions up to the time of failure.

The normal usage of the carrier will now be described. To bring a carrier into service from a storage condition, a supervisor inserts a supervisor data key into the data key reader or slot 73. When initially powered up, the microcontroller will check for the presence of an automatic "final" state record, which should have been written at the last shut down, and then wait for a return to service command from the supervisor. If no final state record can be found, then an automatic error state record will be written and an audible alarm will be given to indicate that some period of time has passed with no valid records having been stored.

Upon receiving a return to service command, an initial state record is written. The carrier announces "download required", wherein the supervisor updates the clock 91 in the carrier using the reader 151. The carrier resumes normal operations, wherein the controller 79 operates the TEC's 27, 25 to bring the internal temperatures of the carrier within the proper ranges. In addition, discharge counters for the primary and secondary batteries are reset.

After the carrier has been brought into service, the batteries are satisfactorily charged, and the internal temperatures are satisfactory (as indicated by the indicator LEDs 75), the supervisor removes his data key from the carrier and transfers the carrier 11 to the pharmacist for stocking.

The pharmacist inserts the pharmacist's data key. Once the pharmacist is recognized, the drawers of the carrier are stocked with drugs.

After the carrier has been stocked, the pharmacist removes the pharmacist data key. The carrier 11 is now ready for use by an operator.

When the operator takes physical control of the carrier, the operator inserts the operator's data key. Thus, the carrier records the identity of the person in physical, and legal, control of the carrier, as well as records the date and time of that control. Whenever a data key is inserted or removed from the reader 73, this event is written the EEPROM. The operator key is then removed. In fact, each data key need only be inserted long enough to have the information thereon read, after which the key can be removed.

If the operator is an emergency medical technician, then the carrier is typically placed on an ambulance. There, it is plugged into the ambulance power supply.

When the operator is on a call, the carrier is disconnected from the ambulance power supply and brought to the patient who requires medical attention. To administer a drug, the operator opens the door 21. This event causes the state record to be recorded. The operator opens a drawer and removes the desired drug. The operator administers the drug to the patient. In addition, the operator enters an identification for the patient, the identifying code for the administered drug, typically a two-digit code), and the quantity of drug administered. This information is entered by way of the keypad 69. To assist the operator, the inside service of the door 21 has an instruction sheet attached thereto. This entered information is recorded as the patient state record in EEPROM 89.

The carrier provides audio responses to the operator to confirm data entries and to provide status information. Thus, whenever, for example, a drug identification code is pressed and entered (by pressing an enter key), the speaker announces the code. Also, whenever the door 21 is opened and closed, and when the TECs engage to operate, the temperature of the non-refrigerated and the refrigerated drugs are announced. The refrigerated drug temperature is also announced when the refrigerated drawer 43 is opened. If the refrigerated drawer 43 is open for longer than 30 seconds, an announcement of "close drawer" is provided every 15 seconds, due to the extreme sensitive nature of these drugs. If the door 21 is open for longer than 5 minutes, with no keypad entries, then "close door" is announced. If the internal temperatures are within 2 degrees of their range limits, and thus close to a temperature violation, then the temperature of the drugs (both refrigerated and non-refrigerated) are announced each minute. Likewise, if a temperature violation occurs, then the temperature of the drugs is announced each minute. If the battery charge is less than 50%, an announcement is made every 5 minutes. If the battery charge is less than 25%, then an announcement is made every minute. When the carrier is on external power, the temperatures of the drugs and the battery status are announced every 15 minutes.

An audio announcement is also provided every 5 minutes when the electronics are not working. The watchdog timer 95 (FIG. 4) provides this announcement, which indicates that the carrier requires immediate service.

As discussed above, a reader/transceiver 151A (FIG. 6A) can be utilized to provide data entries. The transceiver 151A has a visual display 151C. Thus, visual responses to data entries are provided if the data entries are made with the transceiver 151A. The transceiver 151A can have a keypad with alphanumeric characters, thus simplifying entry of data.

The operator can enter information on the drugs, such as drugs utilized, quantity, time, etc. The operator can also enter new drug information, such as patient identification, location of the ambulance call, time of the call, etc.

Some drugs are given at frequent intervals of time. These intervals of time are programmed into the microcontroller and PROM 83. When such a drug is administered and entered into the carrier controller 79 by way of the keypad 69, the speaker will announce at one minute intervals how long it has been since the last administration of the drug. The speaker will also announce the patient identification. This allows monitoring of several patients at one time.

The carrier can service a number of patients at the same time and over the course of several days. The use of different patient identifications maintains each patient state record separate from the state record of the other patients.

When the operator's work shift is nearing its end, the carrier is then transferred to a second operator whose shift is about to begin. The second operator inserts the second operator's data key into the carrier so as to provide a record of this event and then removes his key.

Because the carrier is typically on external power, except when carried away from a source of external power, the drugs can be maintained within their temperature ranges for indefinite periods of time.

After the carrier has been in use for sometime, the carrier can be returned to the pharmacist for restocking. Also, the supervisor may wish to upload the data from the carrier to host computer, which is in the hospital or pharmacy.

The host computer 153 processes the information received from the carriers to produce reports. The raw data is processed to remove time line repetitive data. The data can be sorted in various ways to generate these reports. For example, the reports can be of activities by the operators, supervisors and pharmacists, temperature summaries (including any temperature warnings or violations and the durations of temperature violations), controlled substance usage, refrigerated drug usage, internal or external power usages (a report of internal power usage determines battery replacement time), and upload frequency. Each report identifies the individuals involved (through their data keys) and the specific carrier involved (through the serial no. PROM 122). The data can also be used to generate patient billing information.

In addition, an operator can use the keypad to input other information, such as dispatch of an ambulance and destination of the ambulance. This information, once uploaded to the host processor, can be used to determine utilization requirements of a fleet of ambulances, as well as dispatch summaries and destination reports.

The state records provided by the carrier provide a record of the efficacy of the drugs that have been administered from the carrier as well as a record of compliance with temperature requirements. Such a record is probative of the presence or absence of liability pertaining to the provision of health care.

The foregoing disclosure and showings made in the drawings are merely illustrative of the principles of this invention and are not to be interpreted in a limiting sense.

We claim:

1. A carrier apparatus for maintaining proper temperatures of pharmaceuticals, comprising:
   a) a substantially enclosed and thermally insulated structure having a port which opens to provide access to a cavity located within said structure for receiving said pharmaceuticals;
   b) a heat pump coupled to said structure so as to pump heat into or out of said cavity;
   c) a temperature sensor located in a container, said container being located within said cavity, said temperature sensor being exposed to a liquid in said container, said liquid having a predetermined specific gravity;
   d) means for controlling said heat pump so as to maintain a storage temperature of said cavity, as sensed by said temperature sensor, within a predetermined temperature range, said means for controlling said heat pump having an input that is connected to said temperature sensor and an output that is connected to said heat pump, said means for controlling said heat pump being coupled to said structure.

2. The carrier apparatus of claim 1, wherein said liquid is an aqueous solution.

3. A carrier apparatus for maintaining proper temperatures of pharmaceuticals, comprising:
   a) a substantially enclosed and thermally insulated first structure having a port which opens to provide access to a first cavity located within said first structure, said first cavity containing first pharmaceuticals;
   b) a first heat pump coupled to said first structure so as to pump heat between an exterior of said first structure and said first cavity;
   c) a substantially enclosed and thermally insulated second structure having a port which opens to provide access to a second cavity located within said second structure, said second structure being located inside of said first cavity, said second cavity, containing second pharmaceuticals;
   d) a second heat pump coupled to said second structure so as to pump heat into and out of said second cavity.
   e) means for controlling said first and second heat pumps so as to maintain a first storage temperature of said first cavity within a first predetermined range and so as to maintain a second storage temperature of said second cavity within a second predetermined range.

4. The carrier apparatus of claim 3 wherein said first predetermined range is room temperature and said second predetermined range is 35–50 degrees Fahrenheit.

5. A carrier apparatus for maintaining proper temperatures of pharmaceuticals, comprising:
   a) substantially enclosed and thermally insulated structure having a port which opens to provide access to a cavity located within said structure for receiving said pharmaceuticals, said cavity, containing pharmaceuticals;
   b) a heat pump coupled to said structure so as to pump heat into or out of said cavity;
   c) a temperature sensor located in said cavity;
   d) means for controlling said heat pump so as to maintain a storage temperature of said cavity, as sensed by said temperature sensor, within a predetermined temperature range, said means for controlling said heat pump having an input that is connected to said temperature sensor, said means for controlling said heat pump being coupled to said structure;

e) means for recording information regarding fluctuations of said storage temperature with respect to said predetermined temperature range, said means for recording information being connected to said temperature sensor;

f) means for identifying a first person and a second person who have access to said pharmaceuticals in said cavity;

g) means for making said recorded information accessible to said second person and inaccessible to said first person.

6. The carrier apparatus of claim 5:

a) means for determining if said temperature exceeds said temperature range;

b) said means for recording information regarding fluctuations of said temperature further comprises means for recording occurrences of said temperature exceeding said predetermined temperature range if said temperature exceeds said temperature range.

7. The carrier apparatus of claim 5, wherein said predetermined temperature range has an upper temperature limit and a lower temperature limit, said means for recording information regarding fluctuations of said storage temperature further comprises means for recording occurrences of said storage temperature approaching, within a second predetermined temperature range, said upper or lower temperature limits.

8. The carrier apparatus of claim 5, further comprising:

a) a battery connected to said heat pump and to said means for controlling said heat pump;

b) means for recording occurrences of said battery operating below a predetermined charge level.

9. The carrier apparatus of claim 8, wherein:

a) said battery is rechargeable;

b) means for recording a number of charge and discharge cycles incurred by said battery.

10. The carrier apparatus of claim 5, further comprising a printer, said printer having an input that is connected to said means for recording information.

11. The carrier apparatus of claim 5, further comprising a container located inside of said insulated structure, said container having a lock thereon to prevent the opening of said container, said lock receiving a key for unlocking.

12. The carrier apparatus of claim 5, further comprising a box coupled to an outside of said insulated structure, said box being structured and arranged to receive a discarded hypodermic needle.

13. The carrier apparatus of claim 5, further comprising:

a) said port on said structure comprising a door;

b) a lock coupled to said structure and acting to lock said door;

c) means for activating said lock so as to lock said door when said pharmaceuticals have been stored out of said temperature range.

14. The carrier apparatus of claim 13, wherein:

a) said lock being structured and arranged to receive a key, said key being capable of unlocking said lock;

b) said means for recording information regarding fluctuations of said storage temperature further comprising means for recording occurrences of said locked lock being unlocked by said key.

15. The carrier apparatus of claim 5, further comprising:

a) an audio output device;

b) means for driving said audio output device if said storage temperature exceeds said predetermined temperature range.

16. The carrier apparatus of claim 5 wherein said temperature sensor is located within a container, said container having a liquid with a predetermined specific gravity, said temperature sensor being exposed to said liquid.

17. The carrier apparatus of claim 5 wherein said means for recording information further comprises non-volatile memory.

18. A system for monitoring pharmaceuticals, comprising:

a) plural, portable, thermally insulated containers, each of said containers comprising:

i) a cavity therein, said cavity containing said pharmaceuticals;

ii) a temperature regulator coupled to said container, said temperature regulator comprising a heat source located inside of said cavity and a heat sink located inside of said cavity;

iii) means for controlling said temperature regulator so as to maintain a storage temperature of said cavity within a predetermined temperature range, said means for controlling being coupled to container;

iv) means for recording information regarding fluctuations of said storage temperature with respect to said predetermined temperature range, said means for recording being coupled to said container;

b) means for processing said information from said plural carriers;

c) means for transferring said information from said respective carriers to said means for processing.

19. The system of claim 18 wherein said means for transferring further comprises a radio frequency transceiver.

20. The system of claim 18 wherein said means for transferring further comprises an infrared transceiver.

21. A method providing a record of environmental conditions regarding pharmaceuticals, comprising the steps of:

a) providing a portable, thermally insulated container, said container having a cavity located therein for receiving said pharmaceuticals and a door for accessing said cavity;

b) providing pharmaceuticals inside of said cavity;

c) identifying a first person who has access to said pharmaceuticals in said container;

d) while said first person has access to said pharmaceuticals in said container:

i) operating a temperature regulator located inside of said cavity;

ii) monitoring the temperature of said cavity;

iii) recording information regarding fluctuations of said temperature with regard to a predetermined temperature range, said information being recorded within said container;

iv) making said recorded information inaccessible to said first person;

e) identifying when said first person loses access to said pharmaceuticals in said container;

f) identifying a second person who obtains access to said pharmaceuticals in said container;

g) making said recorded information accessible to said second person.

22. The method of claim 21, further comprising the steps of:

a) determining if said temperature exceeds said temperature range;

b) if said temperature exceeds said temperature range, said step of recording information regarding fluctuations of said temperature further comprises the step of recording occurrences of said temperature exceeding said predetermined temperature range.

23. The method of claim 21, wherein said predetermined temperature range has a upper temperature limit and a lower temperature limit, said step of recording information regarding fluctuations of said storage temperature further comprises recording occurrences of said storage temperature approaching, within a second predetermined temperature range, said upper or lower temperature limits.

24. The method of claim 21, further comprising the steps of:
   a) providing an energy supply for said temperature regulator;
   b) recording an operational capability of said energy supply.

25. The method of claim 21 further comprising the step of recording information regarding a patient receiving one of said pharmaceuticals from said cavity, said information regarding a patient further comprising an identification of said patient and an identification and quantity of said one pharmaceutical.

26. The method of claim 25 further comprising the step of transferring said information regarding fluctuations of said temperature and said information regarding a patient to a data processing system that is separate from said container.

27. The method of claim 26 further comprising the step of processing, in said data processing system, said information regarding fluctuations of said temperature and said information regarding a patient so as to produce a report.

28. The method of claim 22 wherein if said temperature exceeds said temperature range, then locking said door so as to prevent access to said pharmaceuticals.

29. The method of claim 21 wherein said predetermined temperature range has an upper temperature limit and a lower temperature limit, further comprising the steps of:
   a) determining if said temperature approaches, within a second predetermined temperature range, but does not exceed, said upper or lower temperature limits;
   b) if said temperature approaches said upper or lower temperature limits, within said second predetermined temperature range, but does not exceed said upper or lower temperature limits, then providing an indication to said first person.

30. The method of claim 21 further comprising the step of recording the time of day simultaneously with the step of recording information regarding fluctuations of said temperature with regard to a predetermined temperature range.

* * * * *